(12) United States Patent
Staufer et al.

(10) Patent No.: US 9,207,135 B2
(45) Date of Patent: Dec. 8, 2015

(54) METHOD AND DEVICE FOR CARRYING OUT A BRAKE TEST ON TRAILER VEHICLES AND/OR SEMITRAILER VEHICLES

(75) Inventors: Werner Staufer, Ingolstadt (DE); Karsten Gerusel, Munich (DE)

(73) Assignee: MAN TRUCK & BUS AG, Munich (DE)

( * ) Notice: Subject to any disclaimer, the term of this patent is extended or adjusted under 35 U.S.C. 154(b) by 229 days.

(21) Appl. No.: 13/171,609

(22) Filed: Jun. 29, 2011

(65) Prior Publication Data
US 2012/0010779 A1    Jan. 12, 2012

(30) Foreign Application Priority Data

Jul. 7, 2010 (DE) .......................... 10 2010 026 411

(51) Int. Cl.
| | |
|---|---|
| *G01M 17/00* | (2006.01) |
| *G01F 7/00* | (2006.01) |
| *G01F 19/00* | (2006.01) |
| *G01L 5/28* | (2006.01) |
| *B60T 7/20* | (2006.01) |
| *B60T 13/66* | (2006.01) |
| *B60T 17/22* | (2006.01) |

(52) U.S. Cl.
CPC ... *G01L 5/28* (2013.01); *B60T 7/20* (2013.01); *B60T 13/662* (2013.01); *B60T 17/22* (2013.01); *B60T 2270/406* (2013.01)

(58) Field of Classification Search
USPC ............ 701/29.1, 32.8, 34.4, 70, 78; 340/431
See application file for complete search history.

(56) References Cited

U.S. PATENT DOCUMENTS

| | | | | |
|---|---|---|---|---|
| 4,122,434 | A * | 10/1978 | Jensen | 340/453 |
| 5,299,452 | A * | 4/1994 | Caron et al. | 73/129 |
| 5,433,296 | A * | 7/1995 | Webberley | 188/1.11 L |
| 5,681,992 | A * | 10/1997 | Klein et al. | 73/121 |
| 5,717,134 | A * | 2/1998 | Schlichenmaier et al. | 73/121 |
| 5,892,437 | A * | 4/1999 | Scheibe et al. | 340/467 |
| 6,299,261 | B1 * | 10/2001 | Weiberle et al. | 303/20 |
| 6,332,354 | B1 * | 12/2001 | Lalor et al. | 73/121 |
| 7,373,224 | B2 * | 5/2008 | Goetz et al. | 701/32.6 |
| 2003/0080856 | A1 * | 5/2003 | Sparacino et al. | 340/425.5 |
| 2006/0097569 | A1 * | 5/2006 | Eberling et al. | 303/122.15 |
| 2010/0085172 | A1 * | 4/2010 | Ancuta | 340/431 |

FOREIGN PATENT DOCUMENTS

| | | |
|---|---|---|
| DE | 19745581 A1 | 4/1999 |
| DE | 102005024335 A1 | 4/2007 |
| WO | 2008085184 A2 | 7/2008 |

* cited by examiner

*Primary Examiner* — Yonel Beaulieu
*Assistant Examiner* — Lail Kleinman
(74) *Attorney, Agent, or Firm* — Laurence Greenberg; Werner Stemer; Ralph Locher

(57) ABSTRACT

A method carries out a brake test on trailer vehicles and/or semitrailer vehicles. The method senses a semitrailer or trailer which has been newly hitched to the towing vehicle, initializes an on-board brake test for the semitrailer brake system or trailer brake system, initiates at least one defined braking process by the semitrailer brake system or trailer brake system after a defined distance has been traveled, and senses and determines the braking effect of the at least one defined braking process as a braking effect actual value which is compared with a braking effect setpoint value which is present. An information signal is output which takes into account the evaluation result.

16 Claims, 3 Drawing Sheets

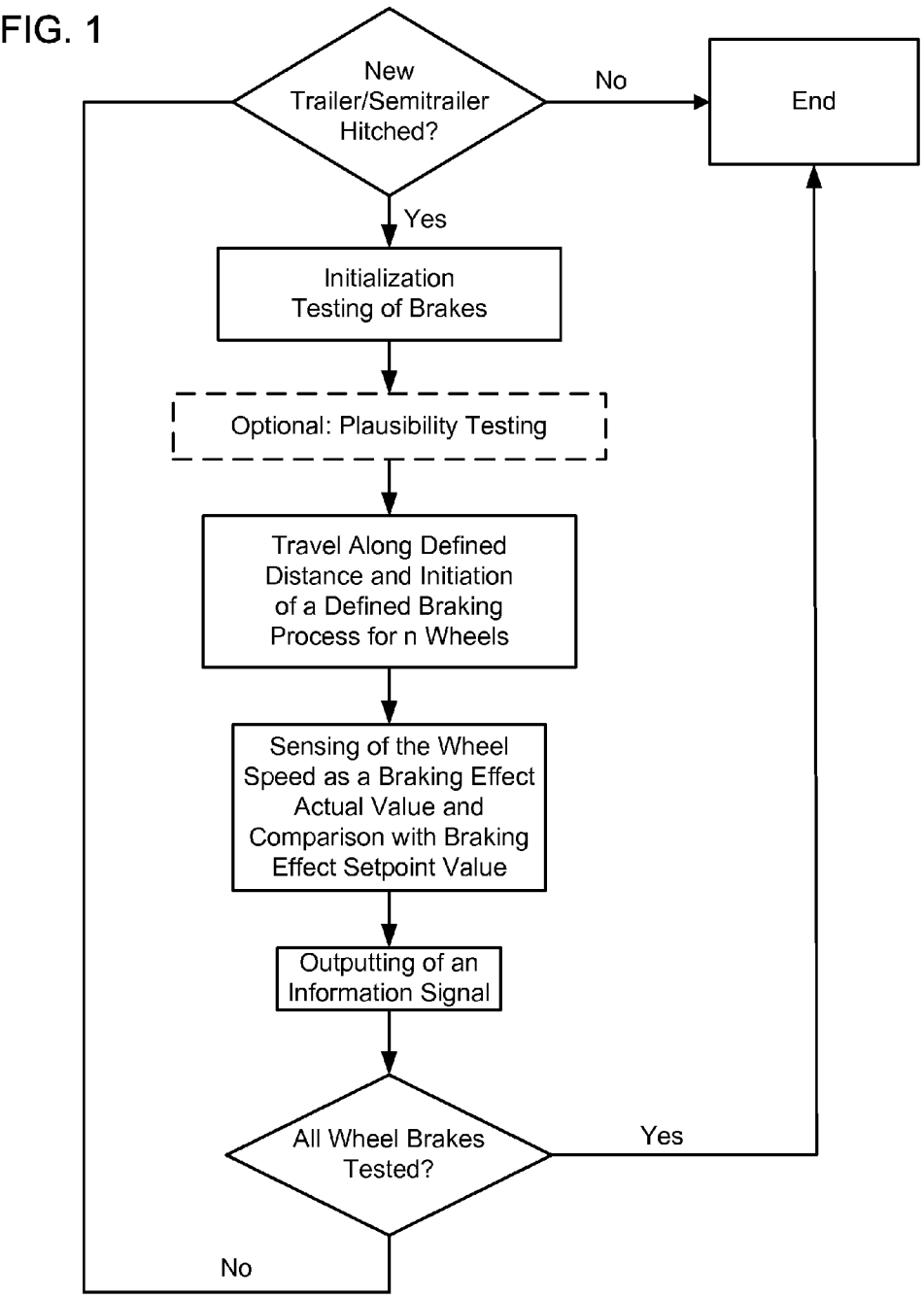

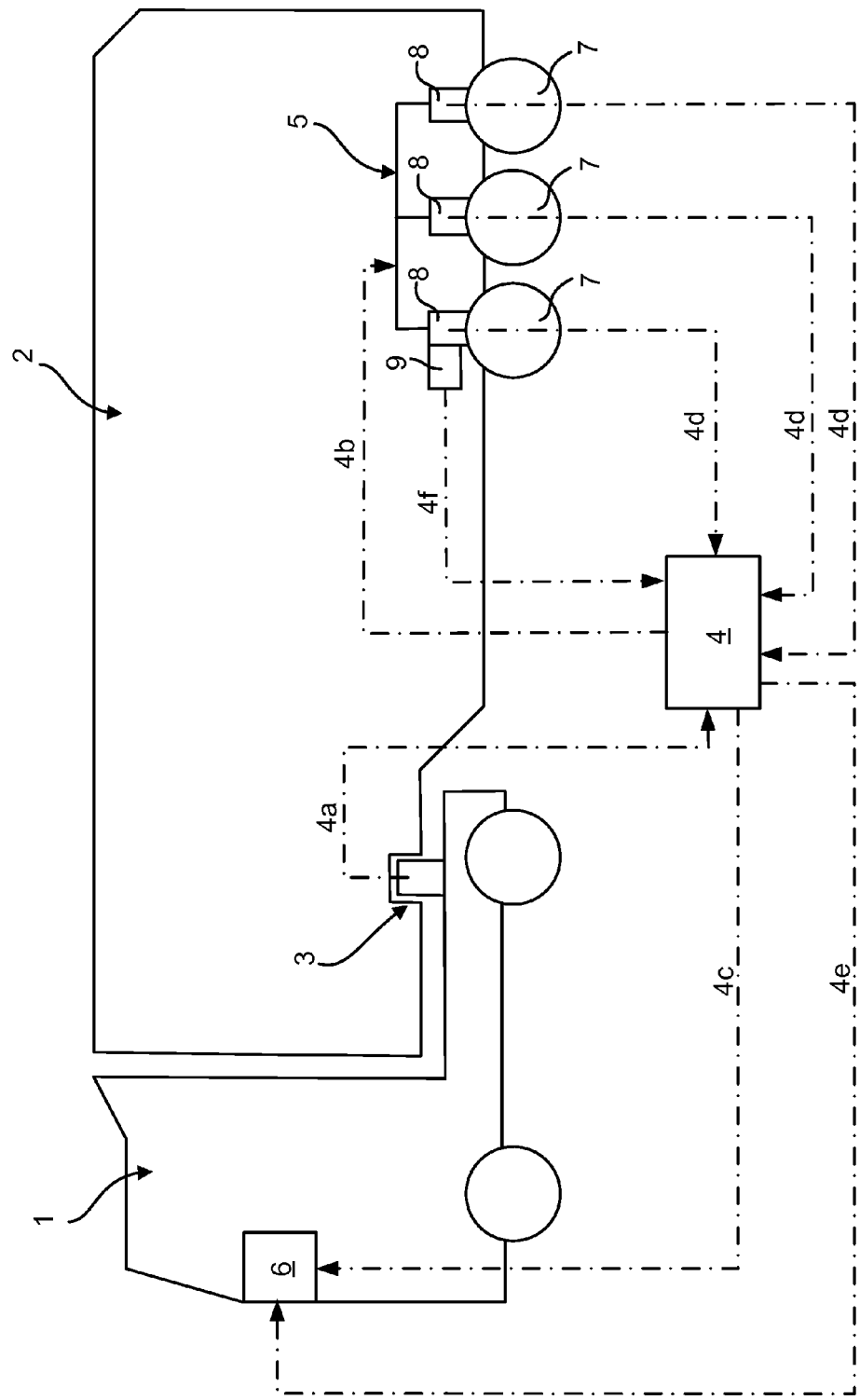

METHOD AND DEVICE FOR CARRYING OUT A BRAKE TEST ON TRAILER VEHICLES AND/OR SEMITRAILER VEHICLES

CROSS-REFERENCE TO RELATED APPLICATION

This application claims the priority, under 35 U.S.C. §119, of German application DE 10 2010 026 411.3, filed Jul. 7, 2010; the prior application is herewith incorporated by reference in its entirety.

BACKGROUND OF THE INVENTION

Field of the Invention

The invention relates to a method for carrying out a brake test on trailer vehicles and/or semitrailer vehicles and to a device for carrying out such a method.

Depending on the purpose of use, utility vehicles can alternatively be operated as independent vehicles or in a combination of vehicles. Combinations of vehicles are understood here to mean combinations of towing vehicles or towing machines with trailers or semitrailers, wherein, for example, articulated drawbar trailers or central axle trailers are generally known as trailers. Semitrailers are mainly operated in the form of semitrailer motor vehicles. In particular at peak times during which there is a high utilization rate of the vehicle fleet, old trailers or semitrailers whose brakes do not function satisfactorily because, for example, a necessary brake test has been missed or has not been carried out, may be used under certain circumstances to cover load peaks. In practical operations, in particular when a semitrailer or trailer is loaded, this constitutes a serious hazard.

Test systems for testing brakes in motor vehicles with a compressed air brake system are already known, for example from published, non-prosecuted German patent application DE 10 2005 024 335 A1; but they generally only make available a test method for testing brakes of a compressed air brake system.

SUMMARY OF THE INVENTION

It is accordingly an object of the invention to provide a method and a device for carrying out a brake test on trailer vehicles and/or semitrailer vehicles which overcome the above-mentioned disadvantages of the prior art methods and devices of this general type, by which the functional capability of a trailer brake system or semitrailer brake system can easily be tested with a high degree of functional reliability.

Accordingly, a method for carrying out a brake test on trailer vehicles and/or semitrailer vehicles is described. The methods includes the following method steps:
a) sensing of a semitrailer or trailer which has been newly hitched to a towing vehicle,
b) initialization of an on-board brake test for the semitrailer brake system or trailer brake system,
c) initiation of at least one defined braking process by the semitrailer brake system or trailer brake system after a defined distance has been traveled,
d) sensing and determination of the braking effect of the at least one defined braking process as a braking effect actual value which is compared with a braking effect setpoint value which is present, and
e) outputting of an information signal taking into account the evaluation result according to step d).

With such a method procedure according to the invention it is possible to reliably determine in a simple and functionally secure way whether or not a brake system of a newly hitched semitrailer or trailer can be operated according to regulations. In this context it is possible, as is also shown by the following statement, for the electronically controlled brake systems and chassis systems which are present in any case on the vehicle to be advantageously used in an advantageous double function to make available the parameters which are necessary for the functional checking of the semitrailer brake system or trailer brake system. The functional checking can therefore be carried out in a way which is not very demanding in terms of components. An information signal is understood here to be any type of signal which determines information for an evaluation device and/or a control unit and/or an operator, whether for further processing and/or for display.

According to one particularly preferred specific refinement there is provision that the sensing of a semitrailer or trailer which has been newly hitched to the towing vehicle is carried out by at least one piece of interface equipment (for example a fifth wheel or similar trailer hitchers), which is present in any case at the interface between the towing vehicle, on the one hand, and the trailer or semitrailer, on the other, in such a way that at least one signal and/or parameter and/or data record from which indirectly or directly defined information about the brake system, to be tested, of the semitrailer or trailer as well as, if appropriate, further information about the type and the design and/or the cargo and/or a static axle load of the semitrailer or trailer, can be derived, is transmitted to a brake testing control unit or brake testing control module, after satisfactory hitching of a new semitrailer or trailer (which is sensed, for example, by a central on-board computer without an additional sensor system, merely through satisfactory electrical connection of, for example, a trailer or semitrailer lighting system and/or satisfactory connection of a compressed air supply). The customary interface equipment which is present in any case can be here, for example, a conventional electrical interface or a compressed air supply between the towing vehicle and the trailer or semitrailer. For example, by means of such an interface it is possible to transmit information such as the type and design of the brake system as well as, if appropriate, also the age of the brake system and/or of the trailer or semitrailer. The cargo and/or an axle load can, for example, be determined or derived from a signal of an ALBS sensor of an automatic load-dependent brake system (ALBS) or can be supplied by such a system, to name just one further example. These data can then be used in any desired combinations to call and/or activate a test pattern for this semitrailer brake system or trailer brake system, the test pattern being stored in the brake testing control unit or brake testing control module for the brake system to be tested.

The initialization of the on-board testing of the brakes for the semitrailer brake system or trailer brake system can, for example, be carried out automatically here whenever a new hitching process is sensed or automatically as a function of the sensed type of semitrailer or trailer. However, alternatively the initialization of the on-board testing of the brakes can also be predefined on a user-specific basis for the semitrailer brake system or trailer brake system, for example by pressing a knob or pushbutton key or else by voice control. Initialization and/or activation of the testing of the brakes is mainly understood here to mean that the system is now placed in an operating mode in which the operator can travel a defined distance within which a brake functional test, and therefore at least one defined braking process for the purpose of testing the brakes, is then performed. This testing of the brakes can basically be performed on an optional basis by the driver, that is to say the driver can also reject and therefore terminate the functional testing of the brakes. According to one particularly preferred refinement there is, however, provision that the checking of the semitrailer brake system or trailer brake system has to be compulsorily carried out if the brake testing control unit or brake testing control module prescribes so, since otherwise a further satisfactory operation of the towing machine is not enabled. This may take place, for example, in such a way that the power of the towing machine is throttled to an appreciable degree, and is, for example, only 25% of the maximum power or else is throttled in such a way that the operation of the towing vehicle is entirely disabled.

In order to test whether, for example, satisfactory checking of the brakes can at all take place owing to the condition of the road, a tire defect, the weather etc. According to one preferred embodiment variant there is provision that first an initialization section of road which preferably forms a component of the defined road is traveled along at a defined lower speed in order, for example, to test an intervention by a traction control system, that is to say to detect a poor coefficient of friction between the tire and the road and, in the event of a defined slip, to output, if appropriate, an abort criterion for the brake test and/or alternatively to adapt characteristic curve or characteristic diagram for the brake test. In the latter case or after the initialization section of road has been satisfactorily traveled through, the actual brake test is then carried out. According to one particularly preferred aspect of the invention it is therefore possible to provide that before the actual on-board testing of the brakes a plausibility test is carried out by which the possibility of carrying out the testing of the brakes in a satisfactory way and/or a defect in the tires of the vehicle and/or a defect in a unit which is required for testing the brakes is sensed or detected as a function of predefined parameters and/or values, for example threshold values, being reached and/or met and/or sensed. Such a defect is then preferably also displayed to the driver, with the result that be is informed about which defect is specifically present and/or that satisfactory testing of the brakes is not possible. In conjunction with this plausibility test it can also be advantageous that the vehicle travels along a defined road. For example, in this way it is possible to detect a satisfactory state of the tires, for example the presence of tire damage or a tire defect, wherein in this context tire defect is to be understood expressly in a relatively wide sense and is also expressly to include, for example, a tire which is inflated to a greater or lesser degree. This is because the sensor system which is present in any case in the vehicle can, for example, detect that during the initialization of a braking process a tire locks or spins immediately, with the result that a corresponding damage profile can be inferred.

According to a further particularly preferred refinement there is provision that the at least one defined braking process is initiated at least after a distance of 50 m and/or on the flat and/or on an inclined section of road having a constant gradient. This ensures that the checking of the semitrailer brake system or trailer brake system is carried out only at low accelerations and speeds and therefore in an operating range of the vehicle in which a brake system which is not functioning satisfactorily is less hazardous. A reliable statement about the effect of the brake can, according to the inventive teaching, also be made over short distances of up to 50 m if the corresponding comparison values are stored in the brake testing control unit or brake testing control module. However, in addition to preferred straight-ahead travel, smooth cornering is also suitable for carrying out the checking of the brakes according to the invention provided that a correction factor, which takes into account the dynamic axle load movement which is directed outward during cornering, is then also included in the cornering here.

Basically, there are a wide variety of possible ways for specifically checking the functional capability of the wheel brakes of the semitrailer brake system or trailer brake system. In this context, the wheel brakes of the semitrailer brake system or trailer brake system can be braked individually or in groups or completely according to a predefined test pattern, and the respectively sensed braking effect actual value can be compared with a corresponding braking effect setpoint value which characterizes the individual braking or the group braking or the complete braking of all the wheel brakes. For example, in the case of individual braking or in the case of group braking of the brakes of the semitrailer brake system or trailer brake system, there may also be provision that a plurality of braking operations are carried out in chronological succession, specifically until all the brakes to be tested have been braked and checked, wherein, for each individual braking process, a defined driving distance is then predefined for the initiation of the defined braking process. By virtue of the possibility of checking the individual wheel brakes, a defect or deficiency in a brake system can also be advantageously individually assigned to the respective wheel brakes and/or, which is also subsequently explained in more detail below, a cargo state can be determined. In the case of group braking or complete braking of the brake system, this is not possible in such detail; however, in the case of group braking or complete braking of individual wheels, the information about a brake system which is not functioning satisfactorily is then available relatively quickly and, if appropriate, further measures can be initiated to perform individual checking of the brake system which has possibly been detected as being defective. If appropriate, a plurality of braking operations can also be provided per wheel or brake in order to obtain more reliable information about the braking function. This may be necessary, for example, in the case of a fluctuating coefficient of friction of the road.

According to a further particularly preferred method procedure there is provision that the defined braking process is initiated by virtue of the fact that a defined brake pressure is applied for a defined time period to the wheel brakes which are to be respectively braked, wherein the predefined pressure is preferably selected in such a way that for a gentle braking process a chronologically extended, continuous buildup of brake pressure occurs up to a defined brake pressure maximum, which brake pressure maximum can be less than or equal to the maximum brake pressure for the respective wheel brake. However, as an alternative to this it is also possible to provide that, for sudden braking, a sudden, peak-like brake pressure, which is less than or equal to a maximum brake pressure for the respective wheel brake, is predefined. The respective type of braking process can be selected and predefined individually depending on the type of trailer or semitrailer, with the result that the optimum functional checking can take place for each type of trailer or semitrailer.

For an unfalsified result with respect to the braking effect of the trailer brake system or semitrailer brake system, there is provision according to a further particularly preferred refinement that during the defined braking process only the trailer brake system or semitrailer brake system alone, but not the brake system of a towing vehicle towing the semitrailer or trailer is actuated. However, if the brake system is nevertheless also actuated, the braking effect of the towing vehicle alone can also be sensed in advance by, for example, carrying out the inventive testing of the brakes for the towing machine alone. This value which is determined in this way can be correspondingly taken into account during the testing of the brakes of the trailer brake system or semitrailer brake system, and can, for example, be subtracted.

As already indicated above, according to one particularly preferred refinement there is provision that, in order to sense and determine the braking effect of a defined braking process, data and/or parameters of at least one electronically controlled brake system and chassis system which is installed in the vehicle, and a braking effect actual value is acquired therefrom. Such electronically controlled brake systems and chassis systems which are present in any case in the vehicle can be, for example, an anti-lock brake system (ABS) and/or a traction control system (TCS) and/or an electronic brake controller (EBC) and/or an electronic stability program (ESP) and/or a vehicle movement dynamics controller (VMDC) and/or an automatic load-dependent brake system (ALBS). These electronically controlled brake systems and chassis systems which are, under certain circumstances, present in any case in the vehicle can therefore advantageously serve to make available, in a way which involves little structural complexity and in a double function, the data which are required for the functional checking of the brake system of the semitrailer or trailer. For example, it is possible to provide here that a slip or a wheel speed is acquired at the at least one braked wheel by at least one slip sensor and/or rotational speed sensor during the defined braking process, which slip value and/or wheel speed value represent/represents in itself/themselves or as a parameter determined on the basis of the wheel speed, for example a rotational acceleration, the braking effect actual value which is compared with a corresponding comparison value which represents the braking effect setpoint value, for example in the exemplary case specified here with a slip setpoint value and/or wheel speed setpoint value or a rotational acceleration setpoint value. Furthermore, it would, for example, alternatively or additionally also be possible to calculate the ratio of the brake pressure with respect to the rotational speed gradient, that is to say, for example, the applied pressure in proportion to the reduction in wheel speed which is achieved, for the wheel brakes which have to be checked, to specify a further, nonconclusive example.

Alternatively or additionally to this it is also possible to provide that the braking effect actual value is determined from the time profile of the drive torque of the towing machine before, during and, if appropriate, after the defined braking process, to be precise in particular by comparison of acceleration values which are determined on the basis of the drive torque of the towing vehicle or the towing machine.

If a defective or faulty trailer brake system or semitrailer brake system is detected, a fault signal is preferably output as an information signal which correspondingly informs the operator and stops him so that he checks or services the brake system. An additional compulsory measure for stopping the operator so that he can actually service or check the brake system or, if appropriate, also replace the semitrailer or trailer, can take the form that when a defective or faulty trailer brake system or semitrailer brake system is detected a towing machine operating mode is disabled or the drive power of the towing machine is throttled to a defined degree.

The present object is additionally achieved by a device for carrying out a method in which a brake testing control unit or brake testing control module is provided in which the acquired data are evaluated and compared with setpoint values, and an information signal is output. Comparison values, preferably in the form of characteristic curves or the like, which characterize defined braking effect setpoint values, are input and stored in the brake testing control unit or brake testing control module.

Other features which are considered as characteristic for the invention are set forth in the appended claims.

Although the invention is illustrated and described herein as embodied in a method and a device for carrying out a brake test on trailer vehicles and/or semitrailer vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is an exemplary flowchart for explaining the functional checking of a trailer brake system or semitrailer brake system according to the invention;

FIG. 3 is a schematic view of a trailer truck with a towing vehicle and a semitrailer.

DETAILED DESCRIPTION OF THE INVENTION

Figure 2A:
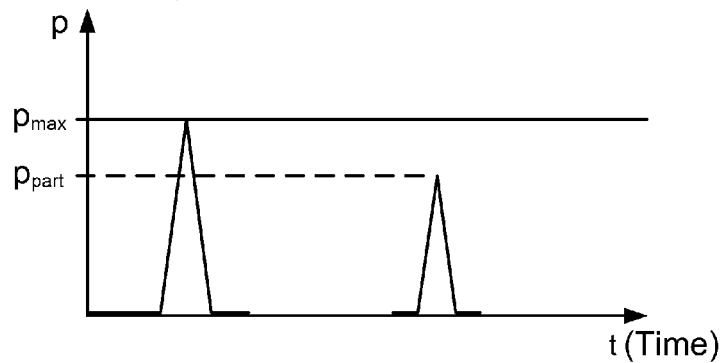
FIGS. 2A to 2C are diagrams showing different brake pressure profiles during braking of the trailer wheels or semitrailer wheels.

Referring now to the figures of the drawing in detail and first, particularly, to FIG. 3 thereof, there is shown a schematic illustration of a trailer truck with a towing machine 1 and a semitrailer 2, which semitrailer 2 is embodied here by way of example with three axles. The semitrailer 2 is hitched here to the towing machine 1 via a fifth wheel 3, wherein the fifth wheel 3 forms an interface via which the semitrailer 2 is supplied with electrical energy and compressed air, but this is not illustrated in detail here. By means of the fifth wheel 3 which is embodied in such a way it is then possible, in the case of a semitrailer 2 which is newly hitched to the towing machine 1, to tap or derive an information signal (signal line 4a) and feed it to a brake testing control unit 4, which evaluates the information signal and, on the one hand, detects (FIG. 1) that a new semitrailer has been hitched to the towing machine 1. In addition, on the basis of this information signal the brake testing control unit 4 can determine what type the semitrailer is and, in particular, which semitrailer brake system 5 it is—the semitrailer brake system 5 being only represented here in an extremely schematic fashion. Furthermore, it is possible, for example by an ALBS sensor 9 (which is illustrated here only by way of example and in an extremely schematic fashion) of an automatic load-dependent brake, to carry out or initialize a determination of mass, for example by determining the static axle load or by a comparison of acceleration and deceleration, in order to feed a cargo state or a mass value (signal line 4f) to the brake testing control unit and therefore allow the cargo state or mass value to be included in the inventive testing of the brakes, with the result that the checking of the brakes can be performed in a cargo-dependent or load-dependent fashion.

At this point it is to be noted that the brake testing control unit 4 is illustrated outside the towing vehicle 1 only for reasons of clarity, but, of course, it can also be a component of an on-board unit or can form a separate functional module which can be viewed and/or operated from the driver's cab.

In addition to the determination of the mass of the trailer or semitrailer and/or the cargo of the trailer or semitrailer it is also possible to carry out, before the initialization of the testing of the brakes which is described in more detail below, if appropriate, a plausibility test by the ALBS sensor 9 of the automatic load-dependent brake, to the effect that, for example, the vehicle travels the distance which is desired to be traveled, and it is tested whether this plausibility test satisfies defined properties of the section of road. Specifically, for this purpose it is possible, for example, by evaluating TCS signals and/or ALBS sensor signals, to sense whether a section of road is of an undesired quality, for example has undesired unevennesses (potholes, humps etc.) or is a smooth section of road with a low coefficient of friction. If this is detected, the testing of the brakes is, under certain circumstances, not enabled and, for example, the driver is referred to a new test section of road.

As an alternative to this, it is also possible, as illustrated in FIG. 1, to provide that, after the initialization of the testing of the brakes, such optional plausibility testing is carried out which makes it possible, for example on the basis of defined acquired ABS and/or TCS signals, to mention only a few examples, to be able to determine whether satisfactory testing of the brakes can at all be carried out. Within the scope of this checking it is then possible, for example, also to detect a defect in the tires of a vehicle and, if appropriate, display it to the driver.

As can also be inferred further from FIG. 1, testing of the brakes is initialized, and for example displayed to the driver on the display 6 (signal line 4*c*), if the brake testing control unit 4 detects that a new semitrailer 2 has been hitched.

If, when the testing of the brakes has been initialized, the vehicle is then started by the driver on a preferably flat, straight section of road or on a section of road having a constant gradient, the brake testing control unit 4 preferably automatically carries out a defined braking process, which is stored for the respective sensed type of semitrailer or cargo situation in the brake testing control unit 4. For example, here a brake signal is supplied to the brake system 5 via the signal line 4*b* which is represented by dot-dash lines, according to which brake signal, for example, a maximum brake pressure has been applied, for example, to all six wheels of the three axles of the semitrailer 2, as is illustrated in FIG. 2A, after a predefined distance has been traveled, which leads essentially to locking of the six wheels 7 if the brake system 5 is functioning satisfactorily. Alternatively it is, however, also possible for merely a partial brake pressure, which is reduced with respect to the maximum brake pressure, to be applied to the semitrailer brake system 5, as is represented in FIG. 2A by the right-hand peak in the plane of the diagram. Further brake pressure variants are illustrated in FIGS. 2B and 2C, and will be explained in more detail below.

By use of slip sensors 8 and/or rotational speed sensors 8 which are present at the wheels and form, for example, components of an ABS/EBC system, it is then possible for slip signals 4*d* and/or rotational speed signals 4*d* to be transmitted to the brake testing control unit 4 from the individual braked wheels, which rotational speed signals 4*d* are then processed in the brake testing control unit 4 and/or compared with setpoint values, for example slip setpoint values and/or wheel speed setpoint values, which are stored there for the selected braking process. If the actual values do not deviate from the setpoint values, a satisfactorily functioning brake system of the semitrailer 2 is indicated on the display 6 via the signal line 4*e*. However, if, for example, one of the wheel speed actual values deviates from a predefined wheel speed setpoint value, a fault signal can be output via the signal line 4*e* and it can be indicated on the display 6 that a semitrailer brake system 5 which is not functioning satisfactorily is present.

This brake testing process which has just been described is illustrated once more schematically in a general way in FIG. 1 as a flowchart, wherein, after initialization of the testing of the brakes, the vehicle travels along a defined section of road and a defined braking process for n wheels is initiated; the term n wheels means here that, as described above, it is possible to brake all the wheels 7 simultaneously or else also merely to brake them individually or in groups, depending on the test pattern which is provided for the respective type of semitrailer. In particular for this reason in the case of the individual checking or group checking of the individual wheel brakes, it is interrogated at the end of the test routine in FIG. 1 whether or not all the wheel brakes have been checked.

Figure 2B:
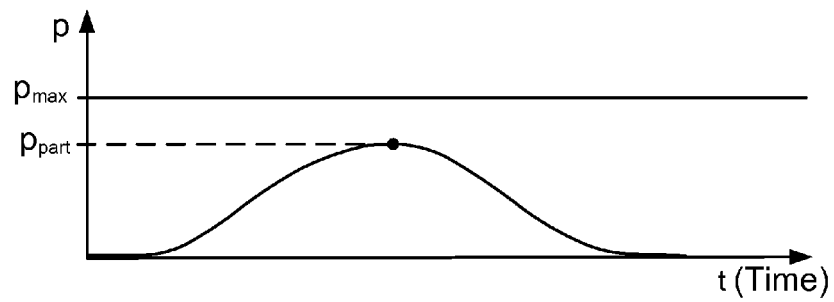
Figure 2C:
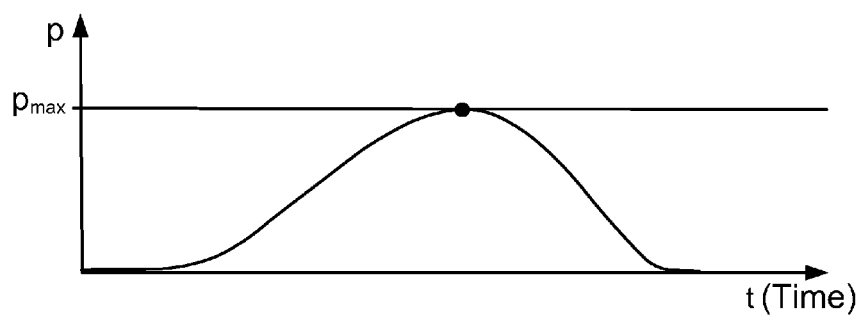

As is also apparent from FIG. 2B, it is, however, also possible, as an alternative to the sudden and jolting braking of the wheels according to FIG. 2A, for the wheels to be braked gently by virtue of the fact that, for example, a pressure value which merely corresponds to a partial pressure of the maximum brake pressure is applied in such a way that it increases continuously and also decreases again. Finally, FIG. 2C illustrates a case which corresponds essentially to the gentle application of brake pressure in FIG. 2B, but with the difference that here the brake pressure which is applied to the wheel or the respective wheel brake corresponds to the maximum brake pressure. Further possible variations are, of course, possible at any time, for example a pulsating buildup of brake pressure or a linear buildup of pressure, to name only two further examples.

The invention claimed is:

1. A method for carrying out a brake test on vehicles, which comprises the steps of:
   a) with a control unit, evaluating an information signal to determine if a vehicle, selected from the group consisting of a semitrailer and a trailer, has been newly hitched to a towing vehicle;
   b) with the control unit, automatically initializing an on-board brake test for a brake system of the semitrailer or trailer whenever a new hitching process is sensed or automatically initializing the on-board brake test for the brake system of the semitrailer or trailer in dependence in a type of the semitrailer or trailer determined to be newly hitched to the towing vehicle;
   c) with the control unit, initiating at least one defined braking process by the brake system after a defined distance has been traveled;
   d) sensing, with a sensor, a braking effect of the at least one defined braking process as a braking effect actual value, and comparing, in the control unit, the braking effect actual value with a braking effect setpoint value which is present;
   e) acquiring at least one slip and a wheel speed at at least one braked wheel by means of at least one slip sensor or rotational speed sensor during the defined braking process of step d), wherein the slip or the wheel speed or a parameter derived from the slip or the wheel speed represents the braking effect actual value which is compared with a corresponding comparison value which represents the braking effect setpoint value; and
   f) outputting, on a display, an information signal taking into account an evaluation result according to step d).

2. The method according to claim 1, which further comprises:
   carrying out a sensing of the vehicle which has been newly hitched to the towing vehicle by means of at least one piece of interface equipment, which is present in any case at an interface between the towing vehicle and the vehicle in such a way that at least one of a signal, a parameter or a data record from which indirectly or directly defined information about the brake system, to be tested, of the vehicle as well as, further information about at least one item selected from the group consisting of a type, a design, a cargo and a static axle load of the vehicle, can be derived, is transmitted to the controller which is selected from the group consisting of a brake testing control unit and a brake testing control module, after satisfactory hitching of the new vehicle; and activating a test pattern stored in the brake controller for the brake system on a basis of data about the brake system which is to be tested.

3. The method according to claim 1, wherein the initializing of the on-board testing of brakes can be predefined individually by an operator for the brake system.

4. The method according to claim 1, which further comprises in that before or after an execution or initialization of the on-board testing of brakes, carrying out a plausibility test by means of which a possibility of carrying out a testing of the brakes in a satisfactory way is detected, a defect in the tires of the vehicle is detected, or a defect in a unit which is required for testing the brakes is sensed in dependence on at least one of predefined parameters or values, being reached, met, or sensed.

5. The method according to claim 1, which further comprises initiating the at least one defined braking process at least after a distance of 50 m, on a flat road or on an inclined section of road having a constant gradient.

6. The method according to claim 1, which further comprises braking wheel brakes of the brake system individually, in groups or completely according to a predefined test pattern, and comparing, in the control unit, a respectively sensed braking effect actual value with a corresponding braking effect setpoint value characterizing individual braking, group braking, or complete braking.

7. The method according to claim 6, wherein in a case of individual braking or in a case of group braking of the brakes of the brake system, carrying out a plurality of braking operations in chronological succession until all the brakes to be tested have been braked and checked, wherein, for each individual braking process, a defined driving distance is predefined for an initiation of the defined braking process.

8. The method according to claim 1, which further comprises initiating the defined braking process by virtue of a fact that a defined brake pressure is applied for a defined time period to wheel brakes which are to be respectively braked, wherein for a gentle braking process the predefined brake pressure is selected in such a way that a chronologically extended, continuous buildup of brake pressure occurs up to a defined brake pressure maximum, the defined brake pressure maximum is less than or equal to a maximum brake pressure for a respective wheel brake, or that, for sudden braking, a sudden, peak-like brake pressure, which is less than or equal to the maximum brake pressure for the respective wheel brake, is predefined.

9. The method according to claim 1, wherein during the defined braking process only the brake system of the vehicle, but not a brake system of the towing vehicle towing the vehicle is actuated.

10. The method according to claim 1, wherein in order to sense and determine a braking effect of the defined braking process:

acquiring parameters selected from the group consisting of parameters of at least one electronically controlled brake system, parameters of at least one electronically controlled chassis system, parameters of an anti-lock brake system, parameters of a traction control system, parameters of an electronic brake controller, parameters of an electronic stability program, parameters of a vehicle movement dynamics controller, and parameters of an automatic load-dependent brake system, which are installed in the vehicle; and determining the braking effect actual value, including the braking effect actual value which is dependent on at least one item selected from the group consisting of cargo of the vehicle and a mass of the vehicle.

11. The method according to claim 1, which further comprises determining the braking effect actual value from a time profile of a drive torque of the towing vehicle before, during and, after the defined braking process, by comparison of acceleration values which are determined on a basis of the drive torque of the towing vehicle.

12. The method according to claim 1, wherein when a defective brake system is detected, the control unit performs at least one of:

outputting a fault signal as the information signal;
disabling a towing vehicle operating mode; or
making available a drive power of the towing vehicle only to a defined degree.

13. The method according to claim 1, wherein the initializing of the on-board testing of brakes can be predefined individually by an operator for the brake system by at least one of pressing a knob, pressing a pushbutton key or by voice control.

14. The method according to claim 1, which further comprises in that before or after an execution or initialization of the on-board testing of the brakes, by driving along a predefined road, carrying out a plausibility test by means of which a possibility of carrying out the testing of the brakes in a satisfactory way, determining a defect in the tires of the vehicle, a defect in a unit which is required for testing the brakes is sensed in dependence on at least one of predefined parameters, threshold values, being at least one of reached, met or sensed.

15. The method according to claim 2, wherein the interface equipment is selected from the group consisting of an electrical interface and a compressed air interface.

16. A device, comprising:

a brake controller selected from the group consisting of a brake testing control unit and a brake testing control module, said brake controller evaluating acquired data and compares the acquired data with setpoint values, said brake controller outputting an information signal, and comparison values, including characteristic curves which characterize defined braking effect setpoint values, are input and stored in said brake controller;

said brake controller is programmed to:

a) sense a vehicle, selected from the group consisting of a semitrailer and a trailer, which has been newly hitched to a towing vehicle;

b) automatically initialize an on-board brake test for a brake system of the semitrailer or trailer whenever a new hitching process is sensed or automatically initializing the on-board brake test for the brake system of the semitrailer or trailer in dependence on a type of the semitrailer or trailer determined to be newly hitched to the towing vehicle;

c) initiate at least one defined braking process by the brake system after a defined distance has been traveled;

d) sense and determine a braking effect of the at least one defined braking process as a braking effect actual value which is compared with a braking effect setpoint value which is present; and e) acquire at least one of a slip and a wheel speed at at least one braked wheel by means of at least one slip sensor or rotational speed sensor during the defined braking process of step d), wherein the slip or the wheel speed or a parameter derived from the slip or the wheel speed represents the braking effect actual value which is compared with a corresponding comparison value which represents the braking effect set-point value; and f) output, on a display, an information signal taking into account an evaluation result according to step d).

\* \* \* \* \*